United States Patent
Koshiba

(10) Patent No.: US 8,470,233 B2
(45) Date of Patent: Jun. 25, 2013

(54) METAL MOLD FOR USE IN MOLDING LENS COVER AND METHOD FOR PRODUCING LENS COVER

(75) Inventor: Akiyasu Koshiba, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 179 days.

(21) Appl. No.: 13/052,039

(22) Filed: Mar. 18, 2011

(65) Prior Publication Data
US 2011/0227253 A1 Sep. 22, 2011

(30) Foreign Application Priority Data
Mar. 18, 2010 (JP) ................................ 2010-061748

(51) Int. Cl.
*B29C 45/44* (2006.01)
(52) U.S. Cl.
USPC .. 264/328.1; 364/334; 425/556; 425/DIG. 58
(58) Field of Classification Search
USPC ............ 264/318, 328.7, 328.1, 334; 425/556, 425/438, DIG. 58
See application file for complete search history.

(56) References Cited

U.S. PATENT DOCUMENTS

| | | | | |
|---|---|---|---|---|
| 3,585,690 | A * | 6/1971 | Tucker | 425/577 |
| 4,747,981 | A * | 5/1988 | Robinson | 264/1.9 |
| 4,889,480 | A * | 12/1989 | Nakamura et al. | 425/DIG. 58 |
| 5,021,930 | A * | 6/1991 | Yamada | 362/539 |
| 5,556,584 | A * | 9/1996 | Yamazaki et al. | 264/46.5 |
| 6,443,723 | B1 * | 9/2002 | Buttigieg | 425/577 |

FOREIGN PATENT DOCUMENTS

| | | | |
|---|---|---|---|
| JP | 3-1919 | * | 1/1991 |
| JP | 4-6703 | * | 1/1992 |
| JP | 5-41102 | * | 2/1993 |
| JP | 8-306221 | * | 11/1996 |
| JP | 2000-207912 | * | 7/2000 |
| JP | 2009-129822 A | | 6/2009 |

* cited by examiner

*Primary Examiner* — Jill Heitbrink
(74) *Attorney, Agent, or Firm* — Kenealy Vaidya LLP

(57) ABSTRACT

A metal mold for molding a lens cover can be provided without increasing the size of the metal mold or the production costs so as to prevent deterioration of production efficiency while also preventing any unfilled area or a thin thickness portion of a resin material from being formed in a final product. Also provided is a method for producing a lens cover utilizing such a metal mold. The metal mold can have a stationary mold, a movable mold and a slidable mold between them. A cavity for molding a lens sealing portion can be formed between the stationary mold and the movable mold, and the slidable mold can have a projection portion projecting into the cavity.

12 Claims, 11 Drawing Sheets

METAL MOLD FOR USE IN MOLDING LENS COVER AND METHOD FOR PRODUCING LENS COVER

This application claims the priority benefit under 35 U.S.C. §119 of Japanese Patent Application No. 2010-061748 filed on Mar. 18, 2010, which is hereby incorporated in its entirety by reference.

TECHNICAL FIELD

The presently disclosed subject matter relates to a metal mold for use in molding a lens cover and a method for producing a lens cover. In particular, the presently disclosed subject matter relates to a metal mold for use in producing a lens cover that is suitable for a vehicle lighting fixture (for example, a headlamp), and a production method utilizing the same.

BACKGROUND ART

FIG. 1 is a schematic cross sectional view illustrating a general conventional vehicle headlamp 2 while omitting the inside required components. In general, such a conventional vehicle headlamp 2 includes a casing 4. Specifically, the casing 4 can be configured to include a concave housing (sealing groove) 6 at its edge portion. The casing 4 can accommodate a bulb, a shielding member, a reflector and other components (not shown) and can be covered with a lens cover 10 at its front opening. The lens cover 10 can be formed (molded) from a resin material such as polycarbonate resin. In order to hermetically seal the casing 4 from its front opening, the lens cover 10 can be configured to include a lens cover main body 12 and a projected lens sealing portion 14 at the edge of the lens cover main body 12.

FIG. 2 is an enlarged view of the portion E encircled by a chain double-dashed line in FIG. 1. As shown in FIG. 2, the housing is coated with a filler 20 thereinside and the lens sealing portion 14 can be inserted into the housing 6, thereby bonding the housing 6 to the lens sealing portion 14. Accordingly, the lens cover 10 can be securely attached to the casing 4.

When the concave housing 6 and the convex lens sealing portion 14 are joined together, the concave housing 6 must have a certain sealing height G (or length) in order to impart the reliable sealing function to the resulting joined portion between the housing 6 and the lens sealing portion 14. In this configuration, when molding the lens cover 10 and the casing 4, the draft for the lens cover 10 and that for the housing 6 may be different from each other (namely, the mold releasing direction 30 for the lens cover 10 and the mold releasing direction 32 for the housing 6 are different from each other as shown in FIG. 1). When the drafts (or the mold releasing directions 30 and 32) are different from each other, the opening degree (or opening angle) of the joined portion may become large. Furthermore, the base portion of the lens sealing portion 14 may be thicker than the average thickness of the other portions of the final product as shown by the portion F in FIG. 2 (shown as a diameter of the cross section thereof).

The vehicle headlight 2 shown in FIGS. 1 and 2 is shown as an example. In this case, the draft difference (angle) D between the lens cover 10 and the casing 4 (housing 6) is 17°, and the sealing height (length) G is 14 mm, and the thicker portion F has a diameter of 6.7 mm, for example. Hereinafter, the portion of the lens sealing portion 14 with a wall thickness greater than the average thickness of the other portions of the final product may be referred to as a thick wall portion (16) and the connecting portion between the thick wall portion 16 and the lens cover main body 12 may be referred to as a straight wall portion (18). In this case, the thickness H of the straight wall portion 18 is approximately 2.5 mm, which is almost equal to the average thickness of the final product.

Next, a description will be given of a method for producing the lens cover 20 of the vehicle headlight 2 with reference to FIG. 4. In this production method, a stationary mold 40 and a movable mold 42 are used to injection mold the lens cover 10.

With reference to FIGS. 3 and 4, an injection molding apparatus (not shown) is used to inject a molten resin material such as polycarbonate in a cavity formed between the stationary mold 40 and the movable mold 42 through an injection runner 50. Then the injected resin material can flow through a cold runner 52 via a gate 54 to the cavity for molding the lens sealing portion 14 and then the cavity for molding the lens cover main body 12 to injection mold the entire lens cover 10. It should be noted that the resin temperature for injection molding can be set to approximately 290° C. while the temperature for the stationary mold 40 and the movable mold 42 can be set to approximately 80° C.

FIGS. 5 to 8 show the results of resin flow analysis for determining how the molten resin material is flowed into the cavity in the metal mold to fill the cavity under the above described molding conditions (including the dimension of the metal mold) when a lens cover 10 is molded. In this case, as schematically shown in FIG. 5, the molten resin material flowed from the gate 54 to the cavity for the lens sealing portion 14 may be flowed into the cavity for the thick wall portion 16 prior to the cavity for the straight wall portion 18 due to the difference in flow resistance. Specifically, since the cavity for the thick wall portion 16 has a smaller flow resistance than the cavity for the straight wall portion 18, the molten resin can be flowed from the gate 54 to the deeper side along the thick wall portion 16 first (see the arrows in FIG. 5). FIG. 6 shows the result of the resin flow analysis near the gate 54 after 0.5 seconds from the injection starting time. Specifically, the molten resin material can be flowed in the direction K along the lens sealing portion 14 (thick wall portion 16) (in the horizontal direction in the drawing) longer than in the direction J along the straight wall portion 18 (in the vertical direction in the drawing) by approximately 20 mm as a flowing length. FIG. 7 shows the result of the resin flow analysis after 3 seconds from the injection starting time when viewed as a perspective view. The molten resin material 60 can be flowed along the cavity for the lens sealing portion 14 denoted by the reference numeral 62 in FIG. 7. Then, as shown in FIG. 8 illustrating the result of the resin flow analysis after 5 seconds from the injection starting time, the molten resin material can be flowed up to the lens cover main body (12) but an unfilled area may remain as denoted by the reference numeral 64 in FIG. 8. When this phenomenon occurs, the upper area of the lens cover main body 12 may have a thin thickness area or unfilled area formed therein and in this case there would be a problem in which a gas contained in the molten resin may be abruptly released at the unfilled area to generate heat thereby forming a silver streak or weld line in the molded product by which the appearance deteriorates.

In order to cope with these problems, the technique disclosed in Japanese Patent Application Laid-Open No. 2009-129822 (in particular, paragraphs 0017-0019) utilizes a movable pin 70 as shown in FIG. 9 corresponding to the cavity for the lens seal portion 14 formed in the movable mold 42. Specifically, the movable pin 70 can be inserted into the cavity for the lens seal portion 14 formed in the movable mold 42 so that the molten resin 60 can be limited to be flowed into the cavity for the thick wall portion 16 of the lens sealing portion 14 along the lens sealing portion 14.

The stationary mold 40 can be provided with a hydraulic cylinder 72 to be connected to the movable pin 70. The hydraulic cylinder 72 can be controlled so that the movable pin 70 is inserted into the cavity for the thick wall portion 16 of the lens sealing portion 14 so that a slight gap 74 is formed between the movable pin 70 and the wall of the movable mold 42 within the cavity for the thick wall portion 16 of the lens sealing portion 14. In this case, the slight gap 74 may be approximately 0.8 mm so that the molten resin material 60 can be flowed but in a limited flow amount.

However, the technique disclosed in Japanese Patent Application Laid-Open No. 2009-129822 requires providing a hydraulic cylinder 72 as well as the space for installing the hydraulic cylinder 72 in the stationary mold 40, thereby increasing the entire size of the metal mold. Of course, without the use of the movable pin 70 and the hydraulic cylinder 72, it may be considered that the thickness of the straight wall portion 18 may be the same as that of the thick wall portion 16. In this case, however, the used amount of the resin material 60 is inevitably increased by that amount, leading to cost increase. In addition to this, the resin material 60 injection molded to be thick requires longer time for curing (cooling time), resulting in deterioration of production efficiency.

SUMMARY

The presently disclosed subject matter was devised in view of these and other problems and features and in view of the conventional art. According to an aspect of the presently disclosed subject matter, a metal mold for molding a lens cover can be provided without increasing the size of the metal mold or increasing the production costs without deterioration of production efficiency while preventing any unfilled area or a thin thickness portion of a resin material from being formed in the final product. Also provided is a method for producing a lens cover utilizing such a metal mold.

According to another aspect of the presently disclosed subject matter, a metal mold for use in molding a lens cover including a lens sealing portion at the peripheral edge of the lens cover can be provided, the metal mold including a stationary mold, a movable mold for defining a main cavity for molding a lens cover together with the stationary mold and a slidable mold disposed between the stationary mold and the movable mold, the slidable mold being capable of slidingly moving into a space between the stationary mold and the movable mold, the slidable mold having a projection portion projected into a cavity for molding the lens sealing portion, the cavity defined by the stationary mold, the movable mold and the slidable mold and being a part of the main cavity.

In the metal mold configured as described above, the projection portion of the slidable mold can have a length that is 60% or less of a length of the lens sealing portion.

In the metal mold configured as described above, the projection portion of the slidable mold can be formed along a parting line between the stationary mold and the movable mold.

In the metal mold configured as described above, the slidable mold can form an end portion of an exposed portion of the lens cover together with the movable mold.

According to still another aspect of the presently disclosed subject matter, a method for producing a lens cover can include: preparing a metal mold for use in molding a lens cover including a lens sealing portion at the peripheral edge of the lens cover, the metal mold including a stationary mold, a movable mold for defining a main cavity for molding a lens cover together with the stationary mold, and a slidable mold disposed between the stationary mold and the movable mold, the slidable mold being capable of slidingly moving into a space between the stationary mold and the movable mold, the slidable mold having a projection portion projected into a cavity for molding the lens sealing portion, the cavity defined by the stationary mold, the movable mold and the slidable mold and being a part of the main cavity; clamping the stationary mold, the movable mold, and the slidable mold; injecting a molten resin into the main cavity for molding a lens cover including the lens sealing portion; slidingly moving the slidable mold; opening the movable mold from the stationary mold; and releasing a molded product from the metal mold.

In the production method configured as described above, the projection portion of the slidable mold can have a length that is 60% or less of a length of the lens sealing portion.

In the production method configured as described above, the projection portion of the slidable mold can be formed along a parting line between the stationary mold and the movable mold.

In the production method configured as described above, the slidable mold can form an end portion of an exposed portion of the lens cover together with the movable mold.

Accordingly, since the projection portion can be projected into the cavity for molding the lens sealing portion, the thickness of the thick wall portion can be reduced thereby suppressing the excessive flow of the molten resin material along the thick wall portion of the lens sealing portion. As a result, the increased size of the metal mold as well as increased production costs can be suppressed, and the deterioration of the production efficiency and any unfilled area or a thin thickness portion of a resin material being formed in the final product can be prevented.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

A description will now be made below to a metal mold for use in producing a lens cover according to embodiments of the presently disclosed subject matter with reference to the accompanying drawings in accordance with exemplary embodiments.

Figure 1:
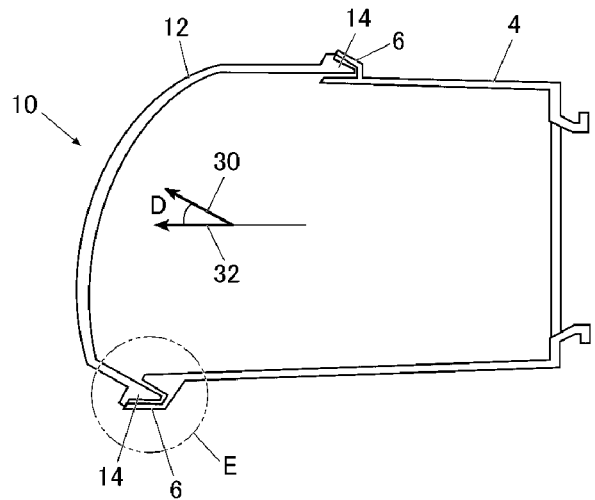
FIG. 1 is a schematic cross sectional view illustrating a general conventional vehicle lighting fixture 2 while omitting the inside components.
Figure 2:
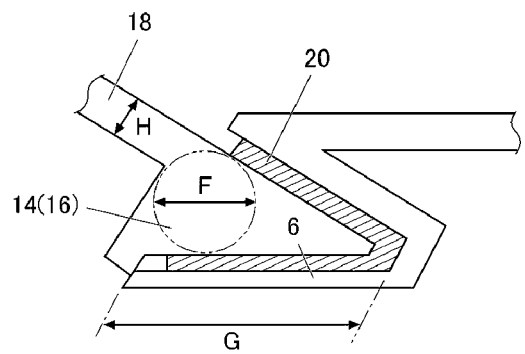
FIG. 2 is an enlarged view of the portion E encircled by a chain double-dashed line in FIG. 1, showing the jointed portion between a casing and a lens cover.
Figure 3:
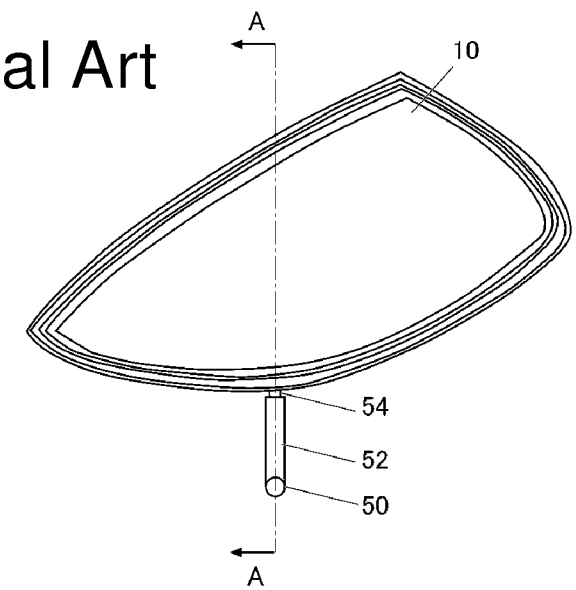
FIG. 3 is a schematic front view of a conventional lens cover, for illustrating a conventional production method.
Figure 4:
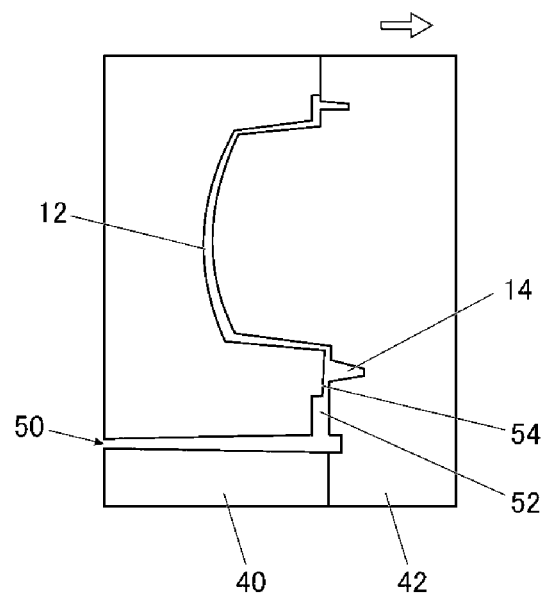
FIG. 4 is a cross sectional view of a metal mold for injection molding the lens cover of FIG. 3 taken along line A-A of FIG. 3.
Figure 5:
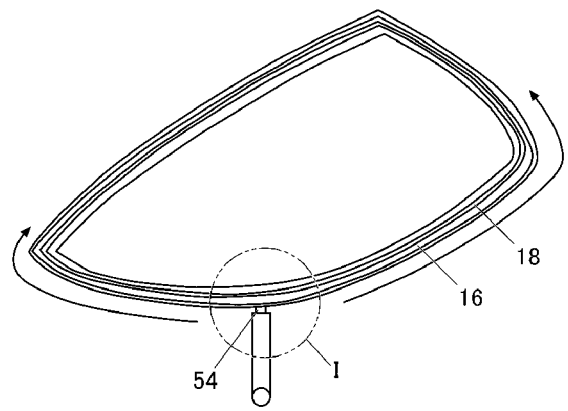
FIG. 5 is a schematic view illustrating the flowing state of a resin material when the lens cover is injection molded.
Figure 6:
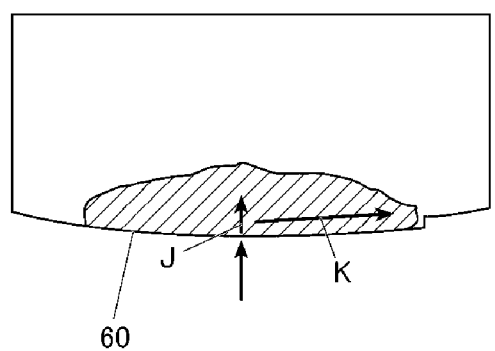
FIG. 6 is an enlarged schematic view showing the portion I encircled by a chain double-dashed line in FIG. 5, for illustrating the result of resin flow analysis for determining how the molten resin material is flowed in the cavity in the metal mold to fill the cavity after 0.5 seconds from the injection starting time.
Figure 7:
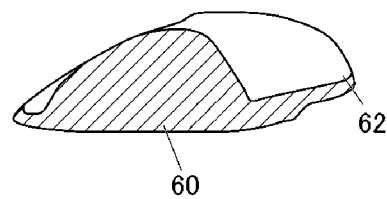
FIG. 7 is a schematic view illustrating the result of resin flow analysis after 3 seconds from the injection starting time when the lens cover is viewed from the vicinity of the gate toward the deeper side of the lens cover, in order to describe a problem in association with a conventional production method.
Figure 8:
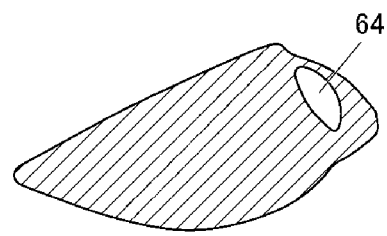
FIG. 8 is a schematic view for illustrating the result of resin flow analysis after 5 seconds from the injection starting time when the lens cover is viewed from above the vicinity of the gate toward the deeper side of the lens cover, in order to describe a problem in association with a conventional production method.
Figure 9:
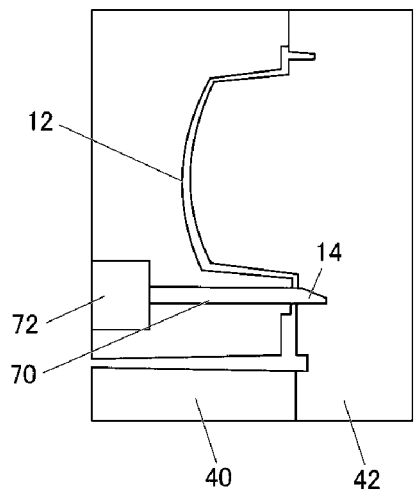
FIG. 9 is a schematic cross-sectional view of a conventional metal mold, illustrating the technique disclosed in Japanese Patent Application Laid-Open No. 2009-129822.
Figure 10:
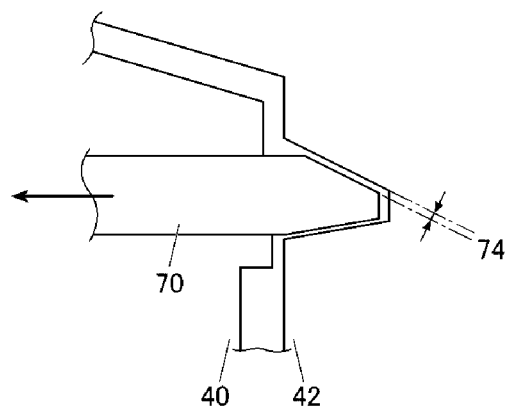
FIG. 10 is an enlarged view illustrating the vicinity of the tip end of the movable pin of FIG. 9 and the surrounding stationary and movable molds.

A lens cover (100) in accordance with the presently disclosed subject matter can be suitably utilized in the vehicle headlamp 2 in place of the lens cover 10 of FIG. 1.

Figure 11:
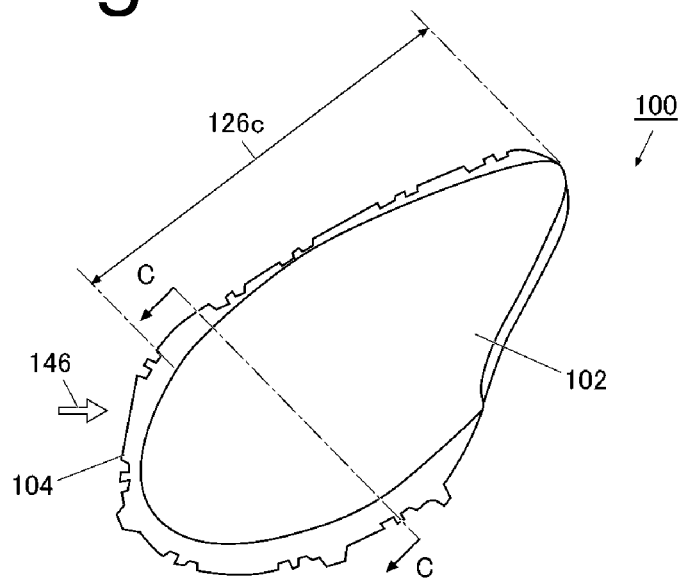
FIG. 11 is a schematic front view of a lens cover made in accordance with principles of the presently disclosed subject matter, illustrating the structure (shape) of the lens cover.

Specifically, the lens cover 100 shown in FIG. 11 can include an exposed portion 102 to be exposed to the outside for functioning as a protective cover for the vehicle headlamp and a shielded portion 104 that can be disposed inside a vehicle body to be shielded. The shielded portion 104 can be formed at the peripheral edge of the exposed portion 102 so as to surround the exposed portion 102. The exposed portion 102 is integrally molded with the shielded portion 104.

Figure 12:
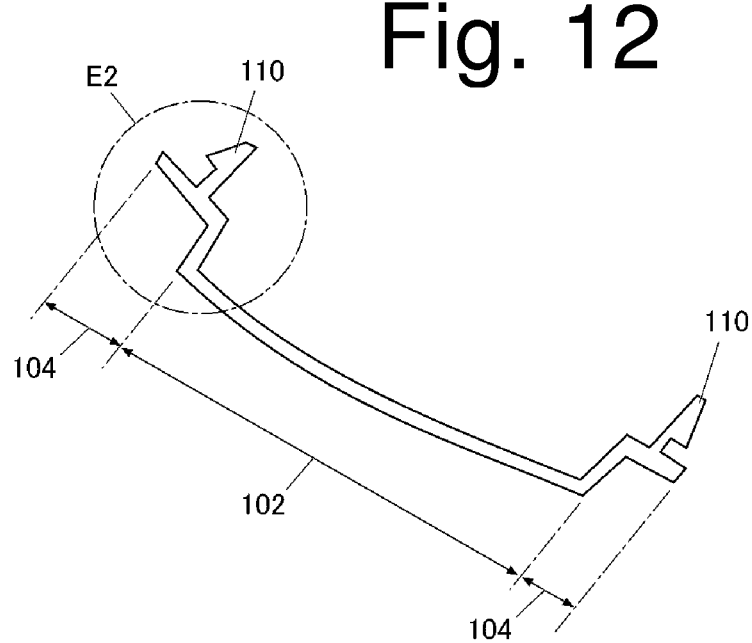
FIG. 12 is a cross sectional view of the lens cover taken along line C-C in FIG. 11.

As shown in FIG. 12, the shielded portion 104 can include a lens sealing portion 110 to be joined to the casing 4 (see FIG. 1).

Figure 13:
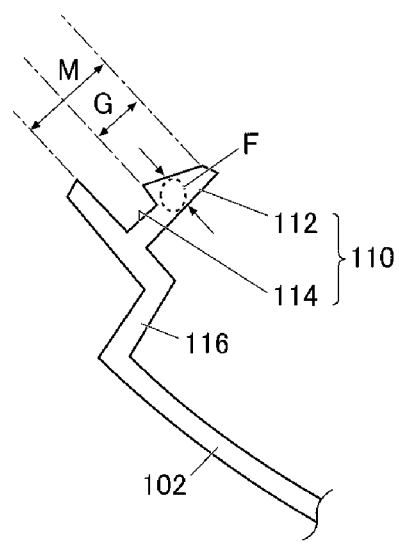
FIG. 13 is an enlarged view of the portion E2 encircled by a chain double-dashed line in FIG. 12.

The lens sealing portion 110 can include, as shown in FIG. 13, a thick wall portion 112 and a thinned portion 114. It should be noted that the thick wall portion 112 can be joined to the housing 6 of the casing 4 (see FIG. 1). In this case, if the length M of the entire lens sealing portion 110 is assumed to 100%, then the sealing length G (or height) G should be 40% or more of the entire lens sealing portion 110. Specifically, in order to ensure the proper sealing function of the lens sealing portion 110 (the thick wall portion 112) with respect to the housing 6, the sealing length G of the thick wall portion 112 should be at least 40% of the length of the lens sealing portion 110 while the thinned portion 114 may be designed to be 60% or less of the entire length of the lens sealing portion 110.

For example, in the illustrated example the length M of the lens sealing portion 110 can be approximately 5 mm while the sealing length G of the thick wall portion 12 can be approximately 2.5 mm.

A description will now be given of an exemplary method for producing the lens cover 100.

The lens cover 100 can be produced by injection molding a molten resin.

In the present exemplary embodiment, the process for producing the lens sealing portion 110 is different from the conventional production method, and accordingly, the following description will focus on this aspect.

Namely, the production method can utilize a metal mold 120 made in accordance with principles of the presently disclosed subject matter as shown in FIGS. 14A to 14E. The metal mold 120 is one example of metal molds for molding a lens cover of the presently disclosed subject matter.

Figure 14:
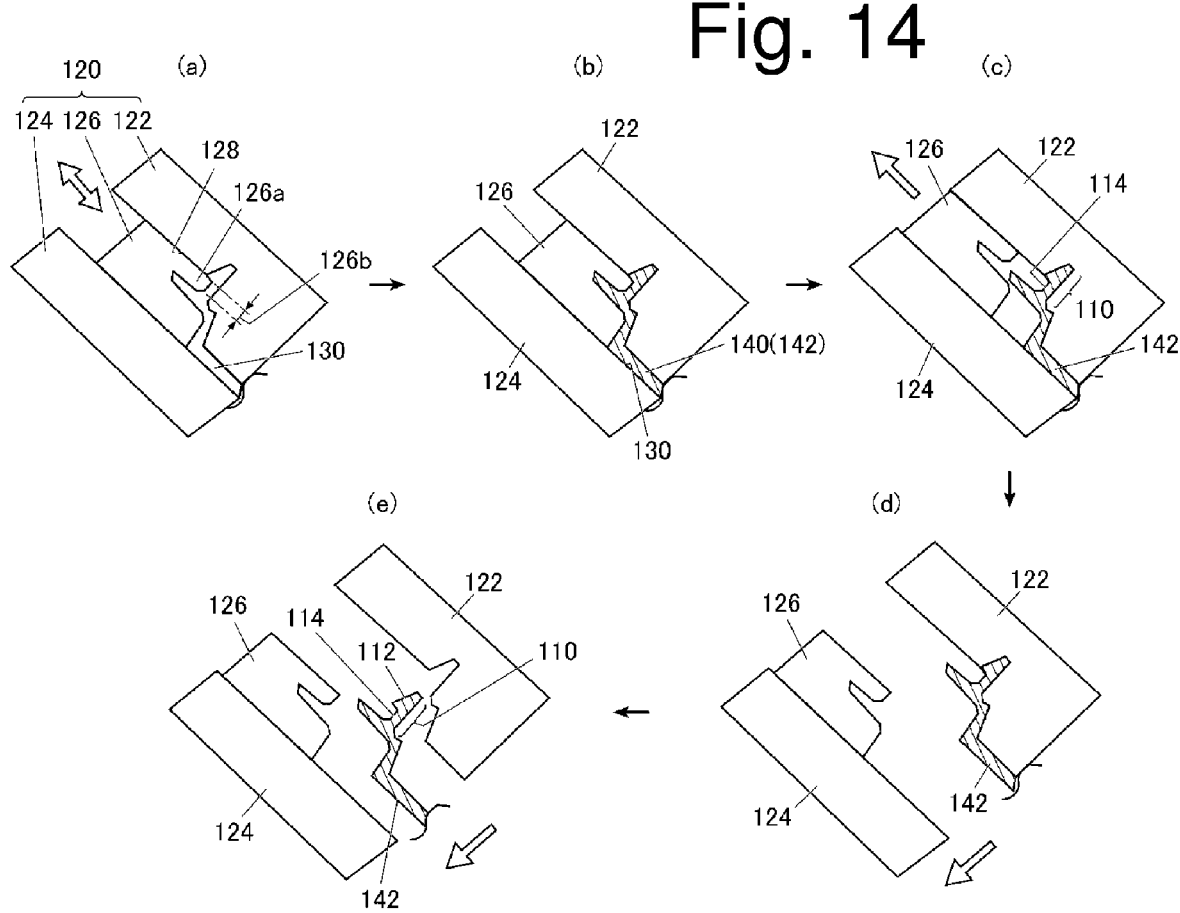
FIGS. 14A, 14B, 14C, 14D and 14E are schematic cross sectional views illustrating respective steps included in a method for producing a lens cover in accordance with principles of the presently disclosed subject matter.

With reference to FIG. 14A, the metal mold 120 can be configured to primarily include a stationary mold 122, a movable mold 124, and a slidable mold 126. The slidable mold 126 can be disposed between the stationary mold 122 and the movable mold 124 so as to be freely slidable in a space between the stationary mold 122 and the movable mold 124.

The slidable mold 126 can include a projection portion 126a so that a part of the slidable mold 126 projects toward the stationary mold 122. The projection portion 126a can be formed to have a shape corresponding to the thinned portion 114 of the lens sealing portion 110. The length 126b of the projection portion 126a can be set to be substantially equal to that of the thinned portion 114, i.e., to be within 60% of the entire length of the lens sealing portion 110. It should be noted that the projection portion 126a can be formed along a parting line 128 between the stationary mold 122 and the movable mold 126. The direction in which the projection portion 126a projects may be parallel to the parting line 128 or inclined slightly. With reference to FIG. 11, the slidable mold 126 can be present over the area denoted by reference numeral 126c. Further, it should be noted that the slidable mold 126 can form an end portion 106 of the exposed portion 102 together with the movable mold 124.

In an actual example of a production method, first, the stationary mold 122, the movable mold 124 and the slidable mold 126 are fixed in position and clamped to form a cavity for molding the shape corresponding to the lens sealing portion 110 (clamping). Accordingly, the projection portion 126a of the slidable mold 126 can project out into the cavity 130.

Then, as shown in FIG. 14B, an injection molding apparatus (not shown) can inject a molten resin material 140 into the cavity 130 to fill the same with the resin material 140 (injection and filling). In FIG. 11, a hollow arrow 146 is shown as an injection direction of the resin material 140. During the resin injection molding, the metal mold 120 (the stationary mold 122, the movable mold 124, the slidable mold 126, and the like) is cooled with a cooling mechanism (not shown) to cure the injection molded resin material 140, whereby a molded product 142 can be completed (cooling and curing).

Then, as shown in FIG. 14C, the slidable mold 126 can be slidingly moved (retracted) from between the stationary mold 122 and the movable mold 124. Accordingly, the thinned portion 114 can be exposed out of the lens sealing portion 110 of the molded product 142.

Next, as shown in FIG. 14D, while the molded product 142 remains on the stationary mold 122, the movable mold 124 together with the slidable mold 126 can be retracted from the stationary mold 122 (opening the metal mold and releasing the product).

Then, as shown in FIG. 14E, the molded product 142 can be released from the stationary mold 122 to complete the lens cover 100 including the lens sealing portion 110 (releasing).

As described, the method for producing the lens cover 100 can utilize the slidable mold 126 with the projection portion 126a projected toward the stationary mold 122, and inject the molten resin material 140 into the cavity for molding the lens cover 100 while cooling the resin material 140. Then, by retracting the slidable mold 126 to the retracted position, the thinned portion 114 formed can be released from the mold. Since the projection portion 126a of the slidable mold 126 can project out into the cavity with the predetermined length, any excess amount of flow of the molten resin material 140 along the thick wall portion 112 of the lens sealing portion 110 can be effectively suppressed. As a result, the increased size of the metal mold 120 as well as increased production costs can be suppressed, and the deterioration of the production efficiency and any unfilled area or a thin thickness portion of a resin material 140 being formed in the final product can be prevented.

Figure 15:
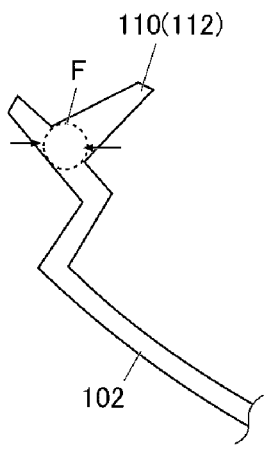
FIG. 15 is an enlarged sectional view of a conventional lens cover in the vicinity of the lens sealing portion made in accordance with a conventional production method.
Figure 16:
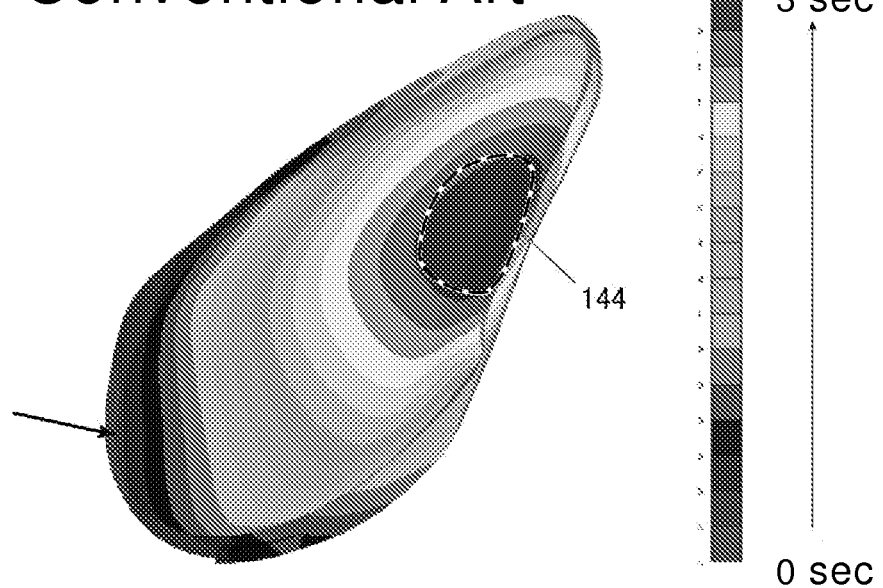
FIG. 16 is a diagram showing the results of resin flow analysis from the injection starting time to a predetermined time (3 seconds) in a conventional production method when the lens cover is viewed from its front.

In contrast to this, the conventional production method for simply injection molding a resin material 140 into a metal mold 120 without a movable pin, a hydraulic cylinder or the like could produce the lens sealing portion 110, as shown in FIG. 15, with the thick wall portion 112 thereof having a cross sectional diameter F of approximately 5 mm. In this case, as shown in FIG. 16 that illustrates the results of resin flow analysis from the injection starting time (0 seconds) to a predetermined time (3 seconds), an unfilled portion 144 could be confirmed to be formed at a certain area of the final product.

Figure 17:
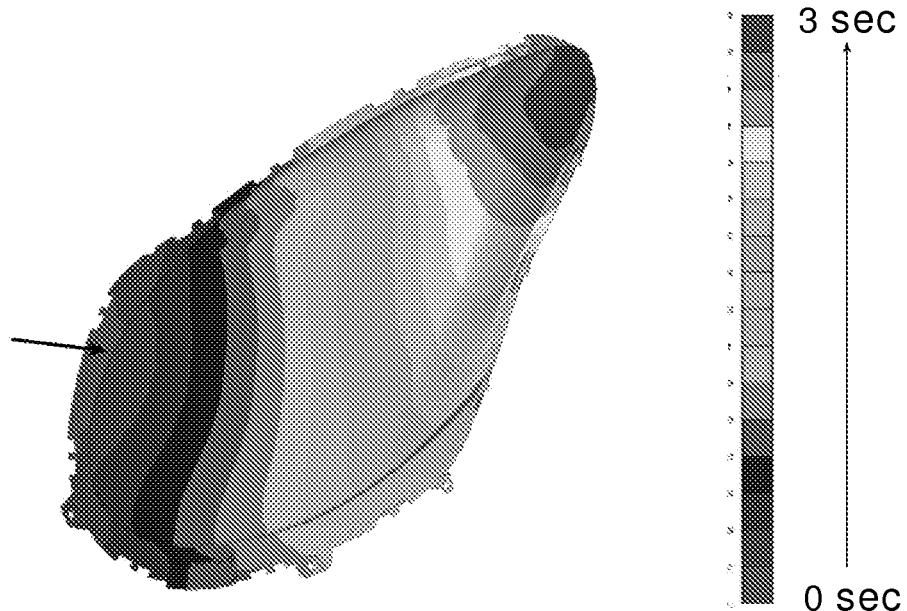
FIG. 17 is a diagram showing the results of resin flow analysis from the injection starting time to a predetermined time (3 seconds) in an exemplary production method of the presently disclosed subject matter when the lens cover is viewed from its front.

According to an exemplary method for producing the lens cover, as shown in FIG. 13, the cross sectional diameter F of the thick wall portion 112 of the lens sealing portion 110 was approximately 2.5 mm. In addition, according to the results of resin flow analysis shown in FIG. 17, the molten resin material 140 could be flowed in a uniform layered-like state without any flow deviation without forming an unfilled portion 144.

Figure 18:
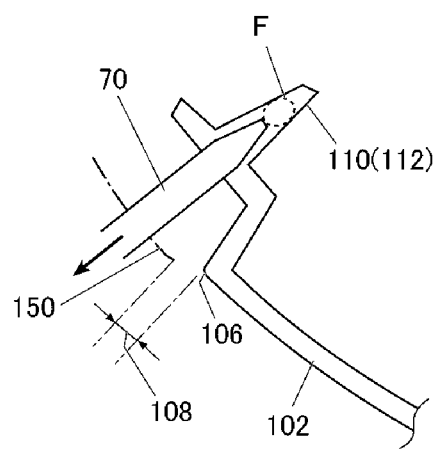
FIG. 18 is a schematic cross-sectional view of a conventional lens cover in the vicinity of the lens sealing portion thereof with the movable pin in the metal mold, illustrating the technique disclosed in Japanese Patent Application Laid-Open No. 2009-129822.

On the other hand, according to the technique disclosed in Japanese Patent Application Laid-Open No. 2009-129822 shown in FIG. 18, the insertion of the movable pin 7 could reduce the cross sectional diameter F of the thick wall portion 112 of the lens sealing portion 110 to approximately 2.8 mm and prevent the formation of the unfilled portion 144. However, the technique requires separate members including the movable pin 70, the hydraulic cylinder 72, and the like thereby increasing the size of the metal mold 120.

In contrast to this technique, the method for producing the lens cover of the presently disclosed subject matter can reduce the cross sectional diameter F of the thick wall portion 112 to approximately 2.5 mm without using a movable pin 70, a hydraulic cylinder 72, and the like. This means an increase in size of the metal mold 120 can be prevented.

Of course, without the use of the movable pin 70 and the hydraulic cylinder 72, the conventional production method may be configured such that the thickness of the straight wall portion 116 as shown in FIG. 13 may be the same as that of the thick wall portion 112. In this case, however, the used amount of the resin material 140 is inevitably increased by that amount, leading to cost increase. In addition to this, the resin material 140 injection molded to be thick requires longer time for curing (cooling time), resulting in deterioration of production efficiency.

In contrast to this, a production method according to the presently disclosed subject matter can form the thinned portion 114 by simply sliding the slidable mold 126, and accordingly, the used amount of resin material 140 and the curing time after injection molding can be suppressed to prevent the increase in production cost and deterioration of the production efficiency.

Next, a description will be given of another exemplary embodiment in which the exposed portion 102 may have an end portion 106 in a curved state.

Specifically, as shown in FIG. 18, when the lens cover 100 is injection molded with a molten resin 140, the end portion 106 of the exposed portion 102 may be curved in some cases to produce a gap 108 between the exposed portion 102 and a vehicle body 150 when assembled. In this case, the produced gap 108 may degrade the appearance of the vehicle body 150. To cope with this problem, the end portion 106 could be extended toward the vehicle body 150 by utilizing a certain slidable mold just like the slidable mold 126. However, the technique disclosed in Japanese Patent Application Laid-Open No. 2009-129822 cannot employ this mechanism to reduce the gap 108 because the movable pin 70 is an obstacle.

Figure 19:
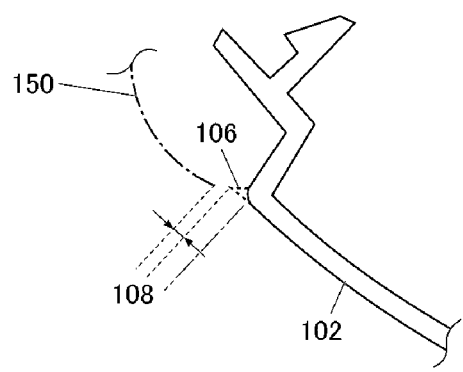
FIG. 19 is an enlarged sectional view of a lens cover in the vicinity of the lens sealing portion thereof made in accordance with an exemplary production method of the presently disclosed subject matter.

On the other hand, a production method according to the presently disclosed subject matter can cope with this problem without considering any obstacle like the movable pin 70. Specifically, the slidable mold 126 can be modified to correspond to the desired shape, for example, a projection projecting from the end portion 106 of the exposed portion 102 (the dotted projection portion from the end portion 106 in FIG. 19), thereby reducing the gap 108 between the lens cover and the vehicle body. Accordingly, this configuration can effectively prevent the degradation of the appearance by the undesired gap generation between the lens cover and the vehicle body.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A method for producing a lens cover, the method comprising:

preparing a metal mold for molding a lens cover including a lens sealing portion at a peripheral edge of the lens cover, the metal mold including a stationary mold, a movable mold for defining a main cavity for molding a lens cover together with the stationary mold, and a slidable mold disposed between the stationary mold and the movable mold, the slidable mold configured to slidingly move into a space between the stationary mold and the movable mold, the slidable mold having a projection portion projected into a cavity for molding the lens sealing portion, wherein the projection portion of the slidable mold is formed along a parting line between the stationary mold and the movable mold;

the lens sealing portion is composed of a thick wall portion at its tip to be jointed to a housing of a lighting unit and a thinned portion which is thinner than the thick wall portion, and is continued from the thick wall portion and connected to the peripheral edge of the lens cover;

the cavity for molding the lens sealing portion includes a first cavity defined by the stationary mold and for forming the thick wall portion and a second cavity defined by the stationary mold and the projection portion of the slidable mold and for forming the thinned portion;

the stationary mold has an inner surface for defining the first cavity with no stepped portion; the slidable mold and the movable mold form an intermediate inner surface with a stepped portion for defining an intermediate part of the first and second cavities; and the projection portion of the slidable mold has a dimension which defines the second cavity and corresponds to a length of the thinned portion and which is 60% or less of a length of the lens sealing portion;

clamping the stationary mold, the movable mold, and the slidable mold;

injecting a molten resin into the main cavity for molding a lens cover including the lens sealing portion so that the molten resin flows in a uniform layer-like state without any flow deviation and without forming an unfilled portion;

slidingly moving the slidable mold;

opening the movable mold from the stationary mold; and releasing a molded product from the metal mold.

2. The method for producing a lens cover according to claim 1, wherein the lens cover has an exposed portion with an end portion, and the slidable mold forms the end portion of the exposed portion together with the movable mold.

3. The method for producing a lens cover according to claim 1, wherein the cavity for molding the lens sealing portion receives a molten resin directly from a gate for injecting the molten resin.

4. The method for producing a lens cover according to claim 1, wherein a movable pin and a hydraulic cylinder are not used.

5. The method for producing a lens cover according to claim 1, wherein the first cavity for molding the thick wall portion has a cross sectional diameter of approximately 2.5 mm.

6. The method for producing a lens cover according to claim 1, wherein the cavity for molding the lens sealing portion extends in a direction crossing a direction of part of the main cavity for molding an exposed portion of the lens cover.

7. A metal mold for molding a lens cover, the lens cover including a lens sealing portion disposed at a peripheral edge of the lens cover, the metal mold comprising:

a stationary mold;

a movable mold defining a main cavity for molding the lens cover together with the stationary mold; and a slidable mold disposed between the stationary mold and the movable mold, the slidable mold configured to slidingly move into a space between the stationary mold and the movable mold, the slidable mold having a projection portion projected into a cavity for molding the lens sealing portion, wherein the projection portion of the slidable mold is formed along a parting line between the stationary mold and the movable mold, the lens sealing portion is composed of a thick wall portion at its tip to be jointed to a housing of a lighting unit and a thinned portion which is thinner than the thick wall portion, and is continued from the thick wall portion and connected to the peripheral edge of the lens cover, the cavity for molding the lens sealing portion includes a first cavity defined by the stationary mold and for forming the thick wall portion and a second cavity defined by the stationary mold and the projection portion of the slidable mold and for forming the thinned portion, the stationary mold has an inner surface defining the first cavity with no projected portion, the slidable mold and the movable mold form an intermediate inner surface with a stepped portion defining an intermediate part of the first and second cavities, and the projection portion of the slidable mold has a dimension which defines the second cavity and corresponds to a length of the thinned portion and which is 60% or less of a length of the lens sealing portion.

8. The metal mold for molding a lens cover according to claim 7, wherein the lens cover has an exposed portion with an end portion, and the slidable mold forms the end portion of the exposed portion together with the movable mold.

9. The metal mold for molding a lens cover according to claim 7, wherein the cavity for molding the lens sealing portion receives a molten resin directly from a gate for injecting the molten resin.

10. The metal mold for molding a lens cover according to claim 7, wherein a movable pin and a hydraulic cylinder are not included.

11. The metal mold for molding a lens cover according to claim 7, wherein the first cavity for molding the thick wall portion has a cross sectional diameter of approximately 2.5 mm.

12. The metal mold for molding a lens cover according to claim 7, wherein the cavity for molding the lens sealing portion extends in a direction crossing a direction of part of the main cavity for molding an exposed portion of the lens cover.

* * * * *